Oct. 15, 1963 E. A. THOMPSON 3,106,823
MECHANICO-HYDRAULIC DRIVE UNIT
Filed April 18, 1960 10 Sheets-Sheet 7

INVENTOR.
EARL A. THOMPSON
BY
*Ralph L. Tweedale*
ATTORNEY

United States Patent Office 3,106,823
Patented Oct. 15, 1963

3,106,823
MECHANICO-HYDRAULIC DRIVE UNIT
Earl A. Thompson, 1300 Hilton Road, Ferndale 20, Mich.
Filed Apr. 18, 1960, Ser. No. 23,058
10 Claims. (Cl. 60—54.5)

This invention relates to a drive unit, and more particularly to a mechanico-hydraulic power and control assembly for operating automatic machinery.

It is known to provide the necessary coordinated motivation for a plurality of movable parts of a machine by a set of rotary cams and corresponding hydraulic pulsators to transfer the motion of each cam follower to its respective driven part of the machine.

Such systems have heretofore been assembled from sets of more or less standardized individual components and mounted independently at convenient locations on the machine with which they are associated. This has resulted in bulky and cumbersome machines upon which it has been difficult to perform required maintenance and service, and which have often exposed these components to unnecessary hazards from contaminants and damage from bumping, vibration and shock.

Accordingly, it is an object of the present invention to provide an improved form of mechanico-hydraulic power and control system in which the components are arranged in a single compact unit affording a maximum of protection from contaminants and mechanical damage, and which is at the same time arranged to accessibly incorporate all necessary parts in a minimum of space.

Another object is to provide a unit of this character which can be mass produced from component parts of a standardized design and which is completely flexible in adaptability to a wide variety of machine motivation problems.

Another object of this invention is to provide a single base assembly which contains an atmospheric reservoir for hydraulic fluid, a high pressure reservoir or accumulator, and a prime mover for imparting motion to a transmission which powers the cam shafts of the pulse program transmitters.

A further object is to provide a combined spacer section and gear box drive adapter by means of which a plurality of mechanico-hydraulic programming units may be interconnected to function as a single synchronous unit.

A still further object is to provide a combined air-oil pump for keeping the high pressure reservoir filled to a predetermined level with oil from the atmospheric reservoir, and for maintaining the desired pressure on the oil within the high pressure reservoir.

Further objects and advantages of the present invention will be apparent from the following detailed description, with reference to the accompanying drawings in which like reference characters refer to the same parts throughout the several views, and in which:

Figure 1:
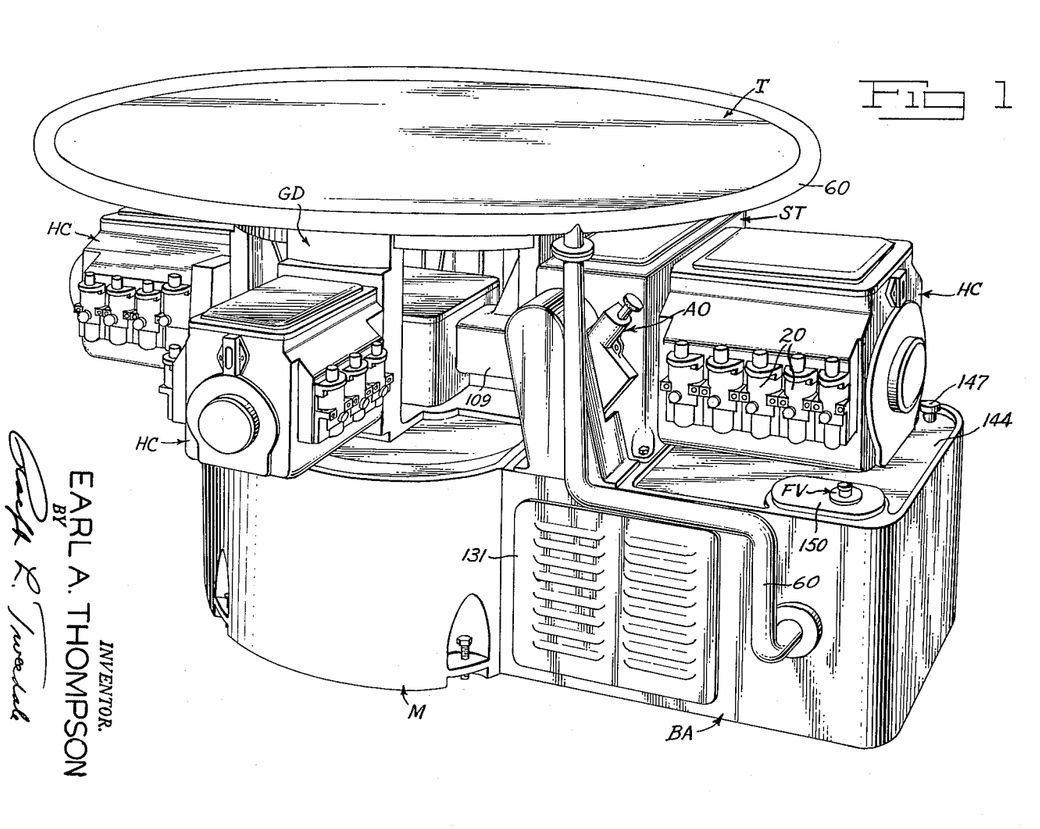
FIGURE 1 is a perspective view of the mechanico-hydraulic drive unit of this invention.
Figure 2:
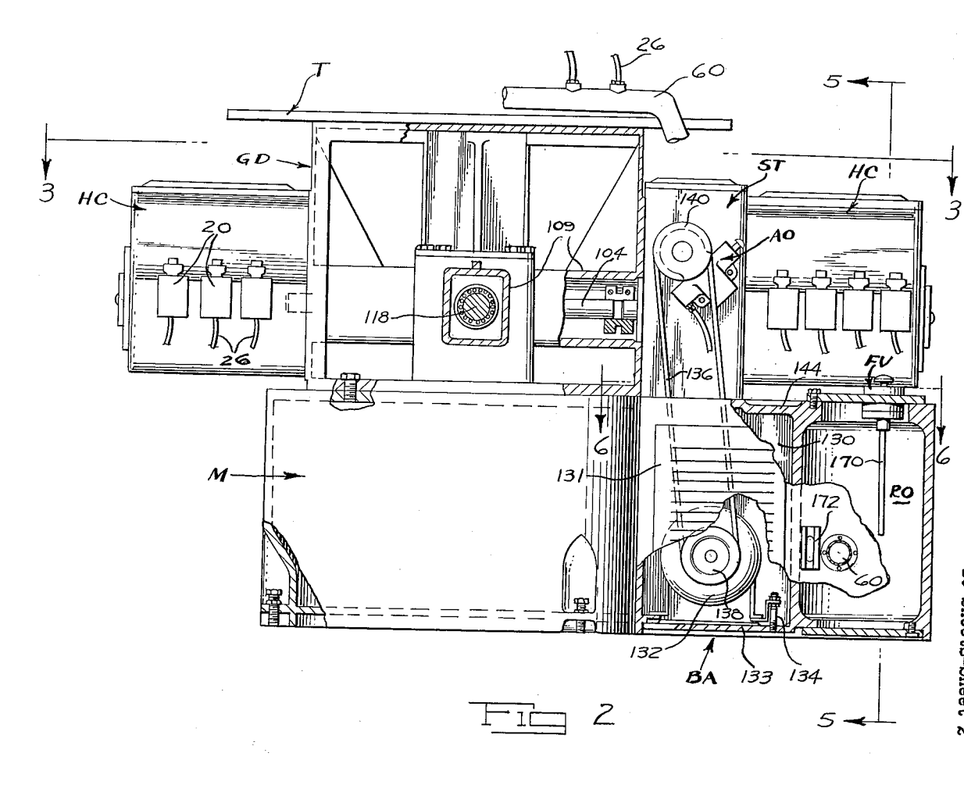
FIGURE 2 is a side elevational view showing the assembled components of the mechanico-hydraulic drive unit of this invention with portions broken away to illustrate certain parts in sectional elevation.
Figure 3:
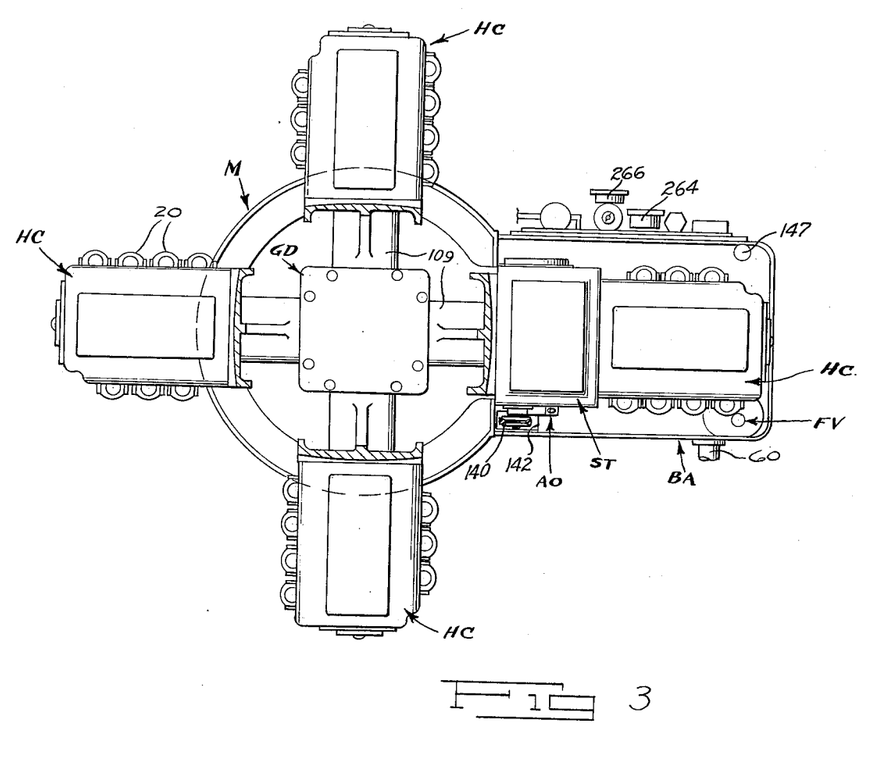
FIGURE 3 is a plan view on line 3—3 of FIGURE 2 further showing the disposition of the various components.

Referring to FIGURES 1, 2 and 3, the various components of the mechanico-hydraulic drive unit are illustrated in their assembled relationship. A cylindrical walled central section M, equipped with suitable leveling screws, provides the basic supporting structure upon which the rest of the components may be mounted. While the round central base section M shown in FIGURES 1–3 is of the type useable with machines which include a rotary indexing table, it will be understood that the equipment disclosed herein is useable with an unlimited variety of machinery, and other shapes or sizes of central sections may readily be employed to accommodate the rest of the equipment to a particular machine.

Rigidly secured to and extending laterally from the central section is a base assembly BA upon which is mounted a two-speed transmission ST which in turn supports one pulse program transmitter unit HC. Mounted upon and extending upwardly from the central section M is a spacer section including a gear box drive adapter GD which may support a plurality of additional pulse transmitter units HC and drive them synchronously. Upon the spacer section a platform T for a rotary indexing table may be located; however, the powering and controlling unit is not limited to applications involving rotary indexing tables. There follows a detailed description of each of the various components of the power and control unit.

Mechanico-Hydraulic Transmitter Units

The mechanico-hydraulic pulse program transmitter units HC are visible in their environmental setting with the rest of the equipment in FIGURES 1, 2 and 3. A plurality of the units HC may be located in a cluster by means of the gear box drive adapter GD above the central section M or other suitable machine base.

Figure 5:
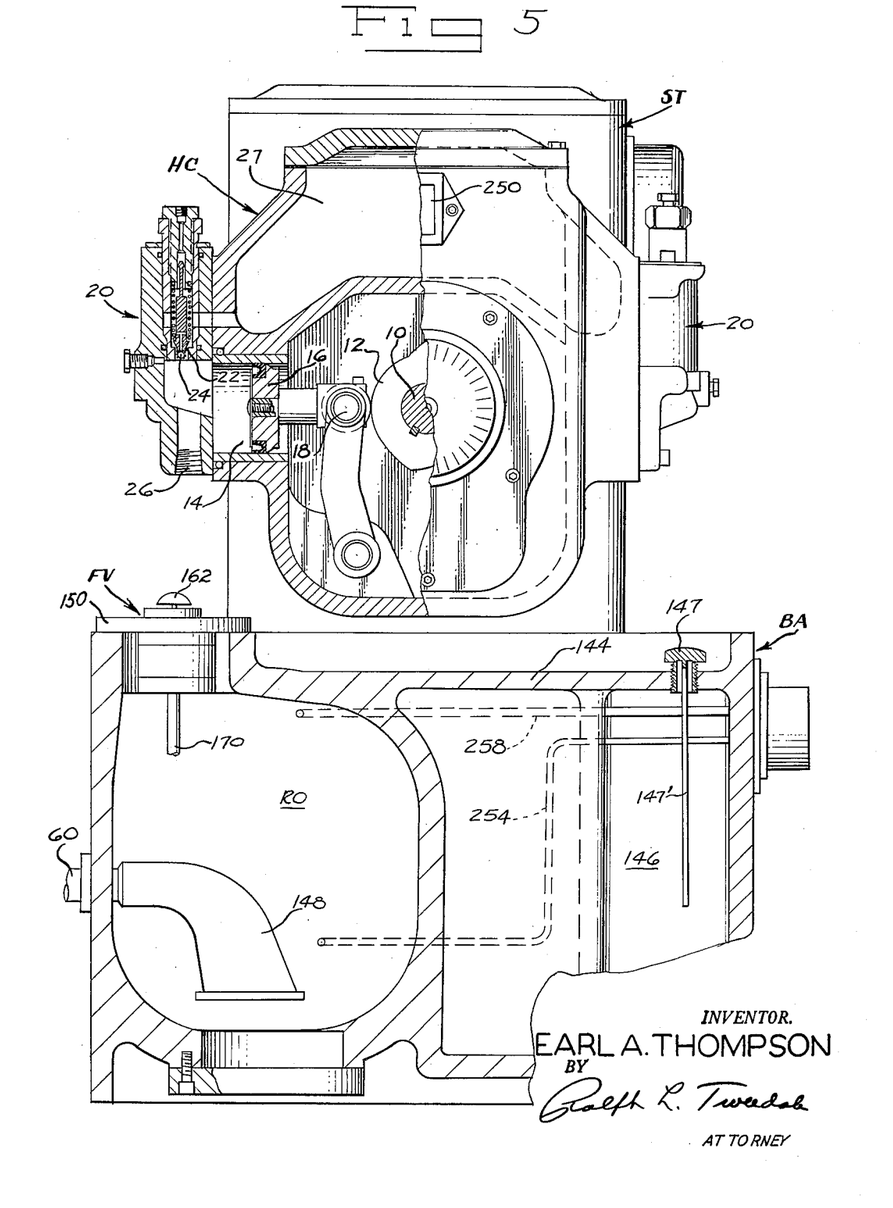
FIGURE 5 is a view in partial sectional elevation taken along the line 5—5 of FIGURE 2 showing at the upper portion some details of the pulse program transmitter component and in the lower portion the interior of the base assembly.
Figure 13:
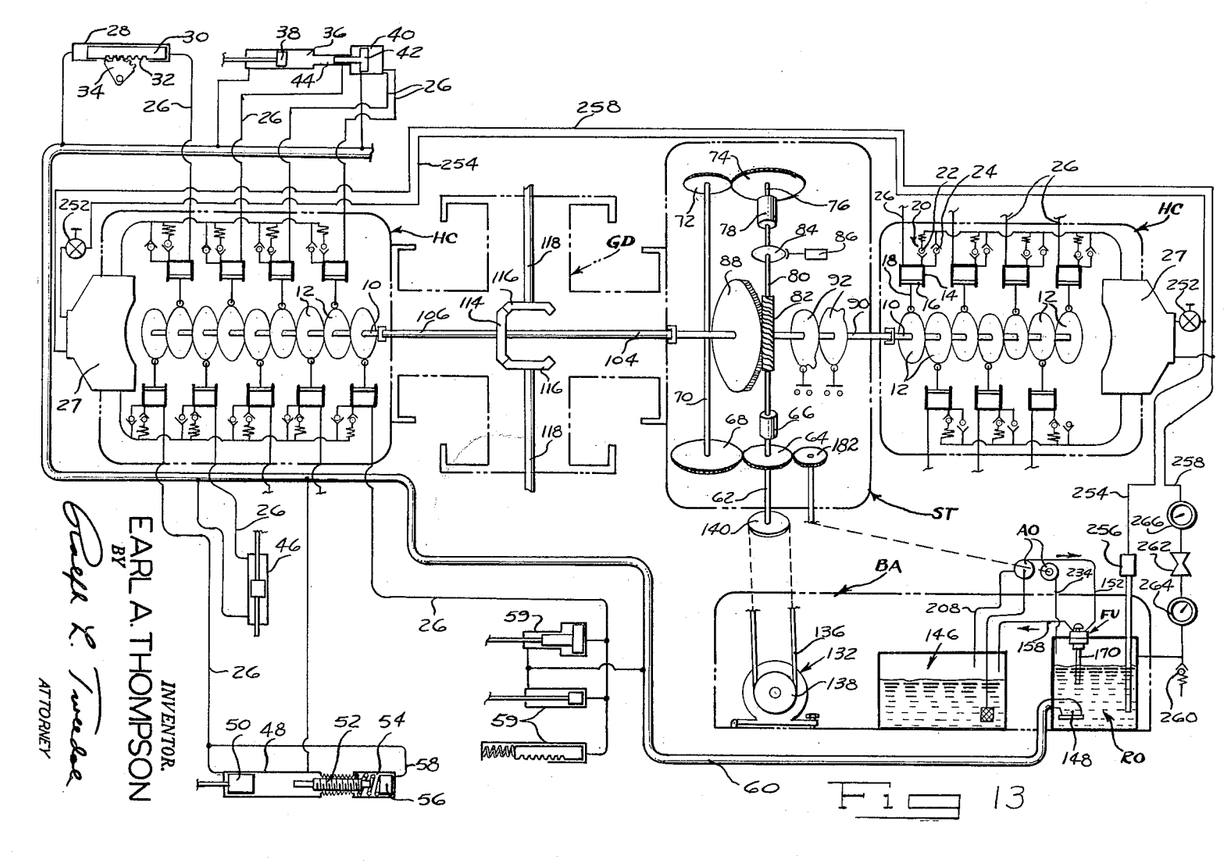
FIGURE 13 is a view in schematic fashion showing the interrelation of the various components disclosed herein which assembled together constitute a self-contained mechanico-hydraulic unit for driving a machine.

The hydraulic controller units HC, as seen more clearly in FIGURES 5 and 13, each comprises a cam shaft 10 with a plurality of rotary cams 12 thereon. Each cam has a contour (omitted in schematic FIGURE 13) composed of predetermined rise and fall ramps designed to produce the motion sequences desired for one of the movable parts of the machine. Each cam operates a hydraulic pulsator section which comprises a single acting pulsator piston 16 reciprocable within a cylinder 14 and operated by the follower 18 for the cam 12. The head of each cylinder 14 may contain a balancing valve assembly 20 comprising an adjustable, outwardly opening, spring-loaded pressure relief valve 22 and an inwardly opening ball type check or replenishing valve 24, each of which communicates with a reservoir 27 which is preferably pressurized at a low, super-atmospheric pressure by means later to be described and is compactly located within the housing of each transmitter HC.

Each pulsator cylinder 14 communicates by a closed liquid column conduit or conductor 26 with a shiftable piston type hydraulic motor on the machine; they together constitute a liquid column type motion transfer device for transmitting the motion imparted by the rotating cam to its follower by means of the liquid column linkage to the receiving piston of the hydraulic motor on the machine, which is mechanically connected to drive the machine element. Thus, a liquid column 26 may be connected to any of the various types of reciprocating or oscillating hydraulic motors in use today for moving machine parts.

For instance, in FIGURE 13, several types of such hydraulic motors are shown in schematic fashion. In the upper left-hand corner of the figure is a cylinder 28 in which a piston 30 is reciprocable. The piston 30 has rack teeth 32 thereon which mesh with the teeth of a radius arm 34 for imparting oscillatory motion to a shaft. To the right of this hydraulic motor, an intensifier assembly is illustrated for obtaining a long stroke with a short thrust embodying increased power at the end. This consists of a long cylinder 36 with a piston 38 of relatively small cross section therein, a large cylinder 40 with a piston 42 of comparatively large cross section therein, and an interconnecting passage 44; a fluid column 26 from one of the cam pulsator sections of a transmitting unit HC conducts hydraulic fluid to an inlet in the interconnecting portion 44 at a location close to the larger area cylinder, and the rear of the larger area cylinder may receive fluid from a plurality of fluid columns 26. With the piston 42 at rest position, oil admitted first to the interconnecting portion 44 will extend smaller piston 38 through a long stroke and then, as oil moves the larger area piston 42 in response to a rising cam contour, the piston will start its short power stroke and immediately close the inlet to cylinder 36. Thereafter, oil delivered to cylinder 40 will cause an intensified delivery into cylinder 36, but at a correspondingly lower rate. In the lower left-hand corner of FIGURE 13 is a simple piston and cylinder motor 46 for obtaining reciprocatory motion which is connected by a liquid column 26 to another of the cam pulsator sections. Below this is a cylinder 48 containing a piston 50 which reciprocates therein; its length of reciprocation, or stroke, is governed by an adjustable limit stop 52 which extends into a second cylinder 54 of the same cross sectional area containing a free-floating piston 56 spring urged away from the limit stop. The liquid column 26 for imparting motion to piston 50 toward limit stop 52 has a by-pass line 58 which diverts fluid to the cylinder 54. As the cam pulsator section pulses fluid through its line 26, the floating piston 56 is moved against the spring to the stop 52 before the piston 50 moves. Thus, as the limit stop 52 is adjusted one way or the other to govern the stroke of piston 50, the total volumetric capacity or displacement will remain constant. There is also shown in FIGURE 13 a single fluid column 26 interconnecting three piston motors 59 which offer varying resistance, whereby they will operate sequentially with a predetermined priority as oil is pulsed through the line 26. These five combinations are exemplary of the types of fluid motors which may be incorporated in a driven machine utilizing this invention.

Each of the fluid motor pistons, or its attached machine element, operates between mechanical limit stops, not specifically shown, which are so arranged that the total displacement of each fluid motor is slightly less than the displacement of the pulsator piston 16 in the cylinder 14. Thus, at the end of each advancing stroke, a small quantity of fluid is blown over the relief valve 22 into the reservoir 27. During the later part of each return stroke, the replenishing valve 24 permits the diverted fluid to return as well as any small amount which may have leaked out of the liquid column. For the purpose of returning each of the fluid motors and their respective transmitter pistons 16, the opposite end of each fluid motor is connected with a plenary volume source of "return oil" fluid under high pressure by means of a manifold 60 communicating with a high pressure accumulator or reservoir RO in the base assembly BA which will be described in more detail subsequently.

Thus a cam controlled, hydraulic programming unit HC for a machine tool is provided which may pulse or transmit motion through liquid columns 26 to actuate the pistons in the hydraulic motors which operate the movable parts of the machine. Four units HC are shown in FIGURE 3 accessibly displayed in radial array, and two such units are shown in FIGURE 13. It will be understood that the various dead-ended flexible columns 26 shown in FIGURE 13 may be directed to any piston motor on the machine for the purpose of powering and controlling it. Also, it is obvious that with several such units HC located on or near a machine, a great many pulsator sections will be available for programming a large number of piston motors to obtain a variety of movements on a machine.

Speed Changing Transmission

The cam shaft 10 of a mechanico-hydraulic programming unit HC may be driven through a self-controlled, two-speed transmission ST (the working elements of which are shown schematically near the center of FIGURE 13). A single transmission unit may be used to control the speed of all of the cluster of units HC which may be used—whether it be just one, or a plurality of such units. The input shaft 62 of the transmission ST drives a pinion 64 and also the input member of a hydraulically-engaged, spring-released clutch 66. Pinion 64 drives a gear 68 secured to a countershaft 70 which carries a pinion 72 at its opposite end. Pinion 72 drives a gear 74 and therewith constitutes a set of speed change gears. Gear 74 drives the input member 76 of a second hydraulically engaged, spring-released clutch 78. The driven members of clutches 66 and 78 are secured to the opposite end of a shaft 80 having a worm 82 thereon and a brake drum 84. The latter has a spring biased hydraulic motor 86 for engaging the brake. The worm 82 drives a worm wheel 88 secured to a main output drive shaft 90.

Secured to the main drive shaft 90 are two adjustable change-speed cams 92 which alternately make and break electrical connections in suitable circuitry (not shown) which in turn shifts standard solenoid actuated hydraulic valves (not shown) for directing hydraulic fluid under pressure first to one hydraulic clutch 66, and then to the other clutch 78, whereby the shaft 90 will be driven for one part of a revolution at a high speed and then will automatically shift itself to a slow speed for the remaining portion of the revolution, as can readily be understood.

The main shaft 90 drives the cam shafts 10 of the various mechanico-hydraulic units HC through a gear box drive adapter explained below. The slower portion of each rotation of the cam shafts 10 in the drive units HC may be used, for example, during the work performing portion of a machine tool cycle where precise control is mandatory. Then, when the machine has finished its particular job on the workpiece and the workpiece has to be ejected to make way for the presentation of a new workpiece, the rapid portion of the cam shaft rotation may be used. The rapid portion is utilized during this change-over portion of the machine cycle to obtain extreme rapidity of movement in the non-productive portion and thus reduce non-productive time to a bare minimum.

Spacer-Drive Adapter

A combined spacer section and gear box drive adapter

Figure 4:
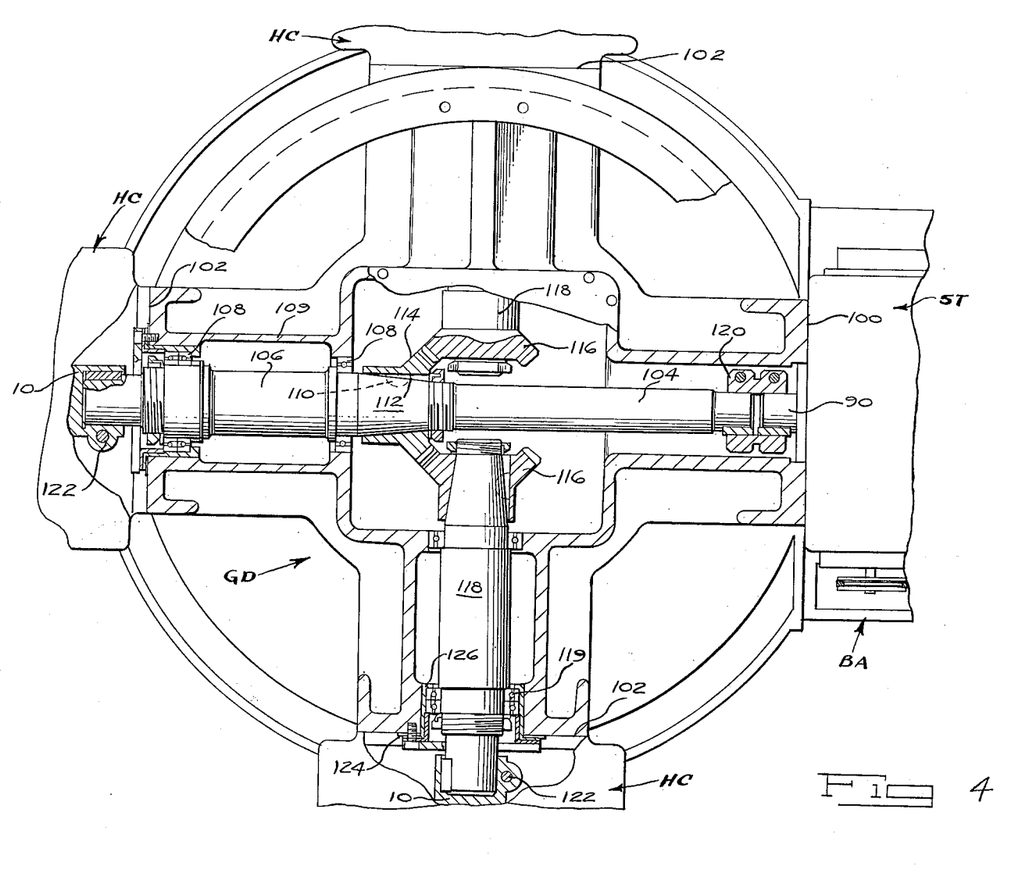
FIGURE 4 is a plan view on an enlarged scale of a portion of the gear box drive adapter in the spacer section which constitutes one of the components of the assembly.

GD is used to synchronously transmit the two-speed rotary motion from the output shaft 90 of the transmission ST to a plurality of mechanico-hydraulic transmitter units HC, as best visualized with reference to FIGURE 4. The spacer section consists of two horizontal ends (or top and bottom) and a plurality of sides arranged as a regular polygon, four of which are shown in the preferred embodiment. This structure serves as a rugged supporting unit upon which portions of a machine may be located, and around which a plurality of transmitter units HC may be clustered. One of the sides 100 is adapted to be secured to the two-speed transmission ST. The remaining faces or sides 102 are adapted to receive one hydraulic controller unit HC.

Extending through the spacer section from the transmission side 100 to the side 102 which is opposite, the gear drive adaptor portion includes a central input shaft 104 which terminates in an enlarged output portion 106 journaled in a suitable bearings 108 within the framework of the spacer-adaptor. Keyed at 110 to a tapered portion 112 which interconnects the input and output portions 104 and 106 of the central shaft is a spiral miter gear 114, which meshes with two other twin spiral miter gears 116 on the inner ends of output shafts 118 which are disposed normal to the main shaft and which also extend normal to, and are journalled within a generally horizontal plane at 119 in, the remaining two sides 102. The shafts 104, 106 and 118 are all enclosed within protective housings 109 formed as part of the framework with only the outer extremity of each shaft available for coupling a unit HC thereto. A plurality of shims 124 may be inserted between the flanged head of a sleeve 126 and the frame work of the adapter unit GD to vary the positioning of the sleeve 126 therein. Since the bearings 108 and 119 for the output shafts are positioned in the sleeves 126, it will be apparent that, by the thickness of the shim pack, the longitudinal relationships of the output shafts may be varied to minimize lash in the meshing of the spiral miter gears.

By means of a coupling 120, the output shaft 90 of the two-speed transmission ST imparts motion to the input shaft 104 of the gear box drive adapter GD. As the input shaft 104 is rotated, first at fast speed and then at slow speed by the transmission, the output portion 106 of his shaft will also rotate in similar fashion, as will output shafts 118 through the gearing. By means of suitable couplings 122, each output shaft 106 and 118 may be directly connected with the main cam shaft 10 of one of the hydraulic controllers HC clustered radially about the cross gear adapter GD. As was previously mentioned, it will be seen that one, two or three of the mechanico-hydraulic units HC may be connected to the faces of the spacer-adapter GD to provide as many of the pulsator sections as are desired for a particular machine.

*Base Assembly*

The base assembly BA, which is secured to and projects in lateral arm-like fashion from the central body section M, and above which the transmission ST and one of the programming units HC may be located, is a compartmentalized, unitary structure which contains two compartments for hydraulic fluid and a third chamber for a prime mover.

A chamber 130 closed by a removable access cover 131 contains a prime mover 132 for imparting motion to the input member 62 of the transmission ST. This may be an electric motor supported on a belt-tightening mount 134 on the bottom 133 of the chamber 130. By means of a suitable drive such as a belt 136 extending from a pulley 138 on the motor 132 through an opening 142 in the top 144 of the base assembly BA to a pulley 140 on the input shaft 62 of the transmission ST, the motor in the base assembly provides the motive power for all the programming units HC.

Figure 6:
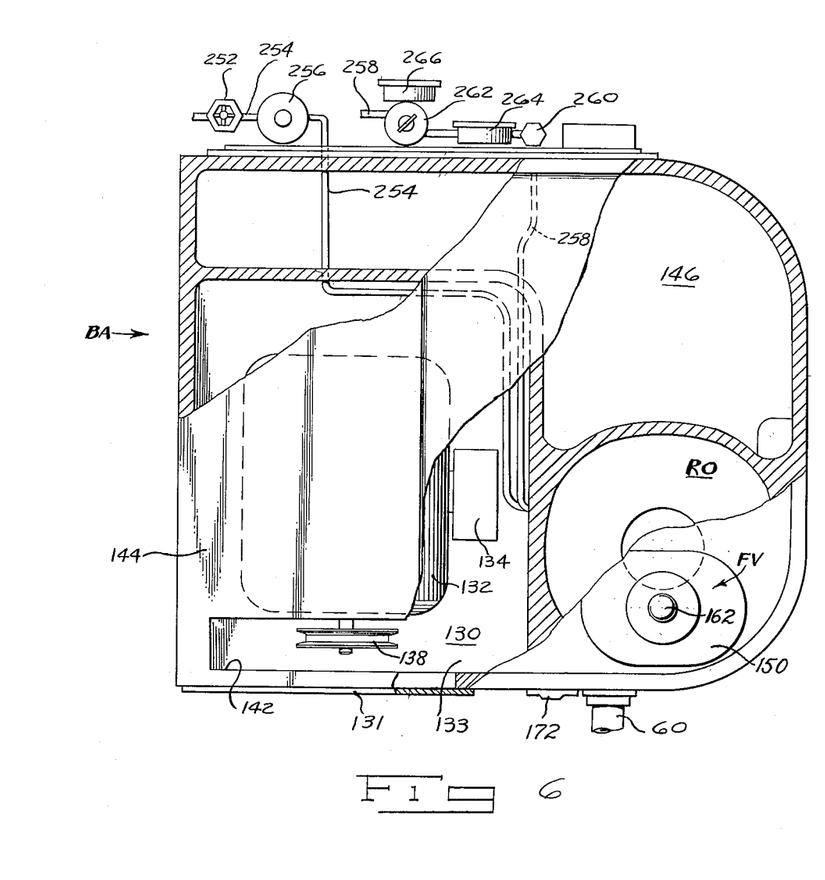
FIGURE 6 is a plan view of the base assembly component with parts broken away to show more details of the interior in section.

A second chamber or compartment 146 (see especially FIGURE 6 and the lower half of FIGURE 5) in the base assembly casing extends compactly in L-shaped fashion around the rear and part of one side of the motor cavity 130. The compartment 146 provides an enclosed, contaminant-proof reservoir chamber for a reserve supply of hydraulic fluid always on hand to serve the needs of the rest of the equipment. A loose-fitting filling cap 147 provides adequate communication with atmospheric pressure, and also includes a "dip-stick" 147' to aid in determining that a proper supply of oil is on hand in the atmospheric reservoir tank 146.

The remaining compartment which occupies the base assembly BA is the high pressure reservoir or accumulator RO with which the "return oil" manifold 60 communicates by means of a turbulance, disbursing, bell-shaped neck 148; as can be seen in the schematic showing in FIGURE 13, the manifold 60 connects the return end of all the piston motors on the machine together to allow for transferring motion from an advancing cam to another cam which is receding whenever possible. The accumulator RO is supplied with oil from the atmospheric reservoir and kept under the desired pressure by means described below. The top of the accumulator cavity RO is closed by a cover 150 in which a filling valve is located.

*Filling Valve*

Figure 7:
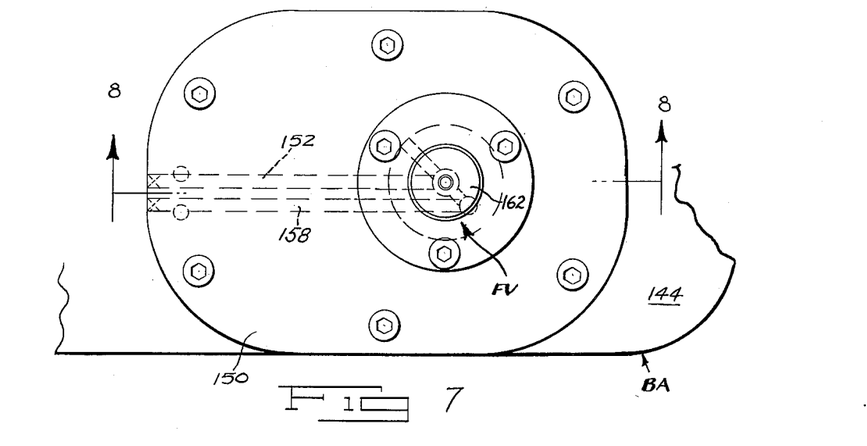
FIGURE 7 is a fragmentary plan view of the base assembly showing the top of the high pressure reservoir where the filling valve is located.
Figure 8:
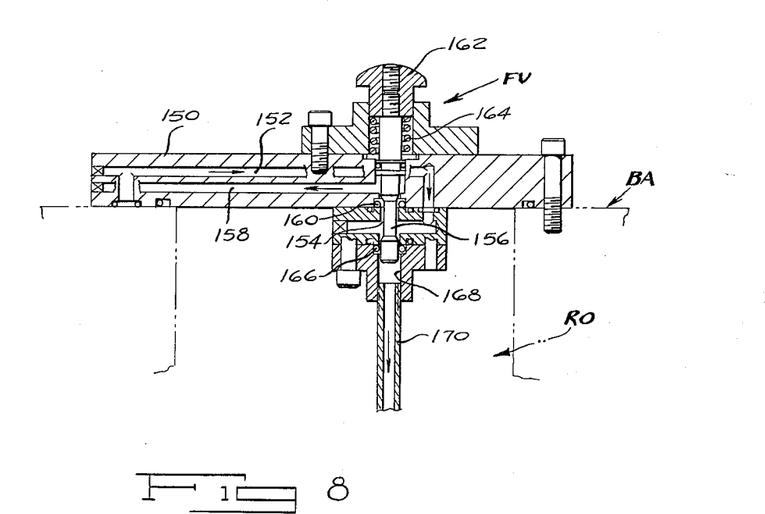
FIGURE 8 is a sectional view on line 8—8 of FIGURE 7 showing details of the filling valve for the high pressure reservoir.

The filling valve FV—as more clearly seen in FIGURES 7 and 8—is a spring loaded, manually operable two-position valve for diverting flow from a continuous stream of oil which is pumped from, and then back to, the atmospheric reservoir. Hydraulic fluid from the atmospheric reservoir is pumped through a passage 152 in the cover 150 of the high pressure reservoir RO and through an opening 154 through which a valve spool 156 extends, and then to a second passage 158 in the cover which returns the fluid to the atmospheric reservoir. An O ring seal 160 in the passage 154 will, when the spool 156 is pushed downwardly by hand piece 162 against the pressure of a spring 164, block flow of fluid to the return passage 158. As spool 156 is moved downwardly by the hand piece 162, a second O ring 166 with which the spool has closed a lower passage 168 is by-passed by the spool 156, and flow of fluid is diverted downwardly in the passage 168 and through a tubular extension 170 thereof to a location beneath the surface of the oil in the high pressure reservoir RO. Only very occasionally, when indicated on a glass sight gage 172 on the side of the base assembly cavity RO, is there a need for replenishing the level of the fluid by means of the filling valve FV.

*Air-Oil Pump*

For providing the continuous flow of oil from the reservoir 146 through the filling valve FV and back to the reservoir, and also for maintaining the proper gas load or air pressure on the oil in the cavity RO, a novel pump AO is provided which pumps oil and also compresses air in response to a single driving mechanism. Referring specifically to FIGURES 9, 10, 11, and 12, the pump AO is shown in detail. The input shaft 62 of the two-speed transmission ST which is driven by the belt 136 running around the pulley 140 affixed thereto, drives a pinion 64 within the transmission as previously explained for driving the countershaft 70 of the transmission. However, pinion 64 has a secondary function in that it also drives the actuating mechanism for the air-oil pump AO through a gear 182 meshing therewith and keyed at 184 to the pump power shaft 186 journalled at 188 in the wall of the transmission. The power shaft 186 for the pump extends into the pump housing 190 and has on its end a bearing supported cylindrical surface 192 which is eccentric to the center line of the shaft.

Figure 9:
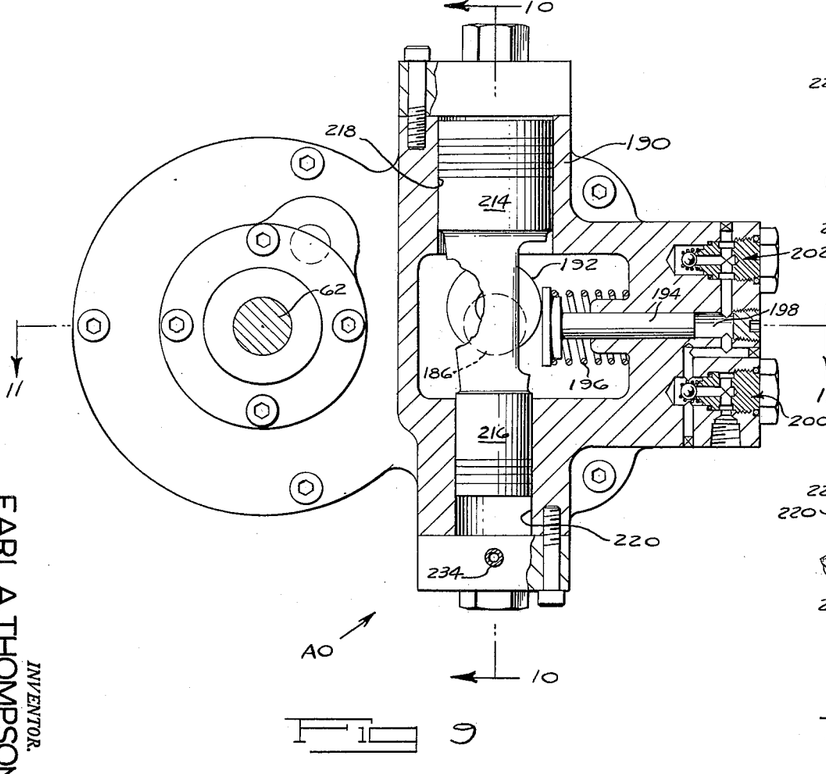
FIGURE 9 is a sectional view showing the interior of the combined air-oil pump which is located on the side of the transmission.
Figure 10:
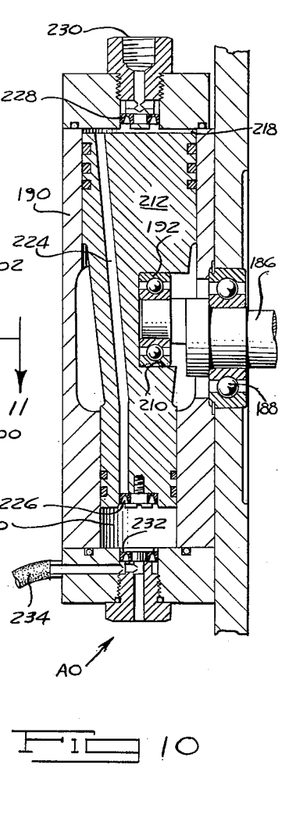
FIGURE 10 is another sectional view of the combined air-oil pump taken along lines 10—10 of FIGURE 9.

Slideably mounted in the pump casing 190 is a plunger 194 biased by a spring 196 into intimate engagement with the eccentric surface 192. Plunger 194 will, as eccentric 192 is rotated by the power shaft 186, reciprocate within a cylindrical bore 198 which assumes the function of a variable volume chamber interconnecting two spring-loaded pressure opening one-way valves 200 and 202 (FIGURE 9). Inwardly opening check valve 200 is inserted in a passageway extending between the oil in the atmospheric reservoir 146 and the variable size chamber 198. Check valve 202 which opens outwardly is inserted in a line extending between the variable volume chamber 198 and the passage 152 leading through the filling valve FV and then back to the atmospheric reservoir 146. As the plunger 194 reciprocates and varies the volume of the chamber 198, oil is first drawn in through check valve 200 from the atmospheric reservoir 146 to the chamber 198. As the plunger 194 moves to decrease the volume in the chamber 198, the check valve 202 is opened by the increase in pressure to allow fluid to pass therethrough and through a passage 204 (FIGURE 12) in the pump casing 190 and thereafter to the passage 152 in the cover 150 of the accumulator RO. Thus, as plunger 194 reciprocates, a very effective pumping action is instigated by means of the check valves 200 and 202.

Figure 11:
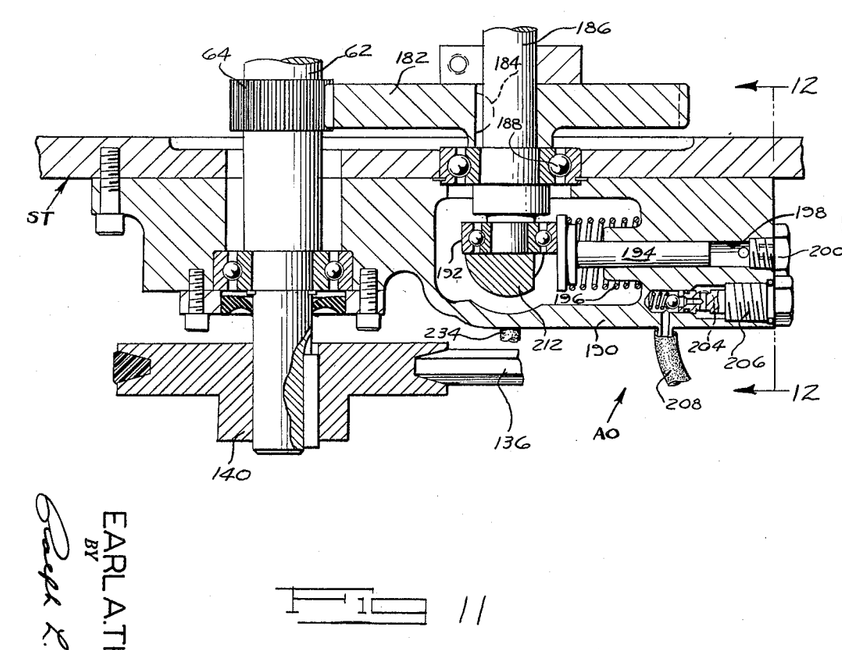
FIGURE 11 is another sectional view of the combined air-oil pump taken along the line 11—11 of FIGURE 9 and showing the drive mechanism therefor.
Figure 12:
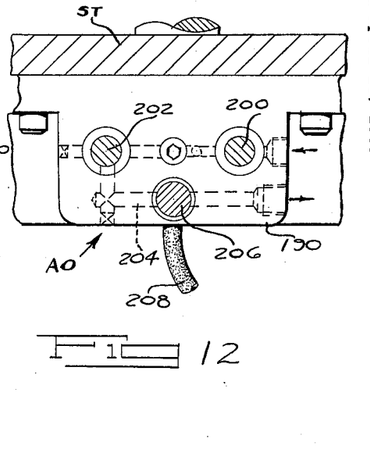
FIGURE 12 is a top view of the pump viewed on line 12—12 of FIGURE 11.

Inserted in escape passage 204 of the oil portion of the combined air-oil pump AO is a relief valve 206 of the spring-loaded ball type clearly seen in the lower right hand corner of FIGURE 11. If the flow of oil should be stopped behind the pump AO (for instance, if the hand piece 162 of filling valve FV should be pushed only part way down to a "dead" spot in which the passage between both O rings 160 and 166 is closed), the valve 206 will open and allow fluid continually being pumped by the pump AO to be returned by means of a divertor line 208 to the atmospheric reservoir.

Eccentric surface 192 also imparts harmonic reciprocatory motion to a piston 212 in the pump casing 190 which has a large end 214 and a smaller end 216 riding in opposed cylinder sections 218 and 220, respectively. The piston 212 has a passage 224 extending lengthwise therethrough which is isolated from the small cylinder section 220 by means of an annular U pack gasket 226 which allows gas—air, in this instance—to flow past it in one direction only. Larger cylinder section 218 communicates with the atmosphere through a similar U pack gasket 228 and a connection 230 with a filter, not shown, which allows passage of air into, but not out of, the larger cylinder section. Smaller cylinder section 220 communicates in one direction only through a third U pack gasket 232 and a conduit line 234 with the interior of the "return oil" accumulator RO.

As the piston 212 is moved downwardly by rotation of the eccentric 192 (FIGURES 9 and 10), air cannot enter passage 224 because of the U pack gasket 226, and air in the cylinder 220 is forced through the U pack 232 and via the line 234 to be compressed into the upper portion of the accumulator RO to keep the oil therein under superatmospheric pressure. Also, as the piston moves downwardly, air from atmosphere will be admitted through the connection 230 to the upper cylinder portion 218 past the one-way U pack 228. When the piston 212 has reached the bottom of its stroke and begins its upward reciprocation, the gas in the larger cylinder 218 will flow through the passage 224 in the piston and past the U pack 226 into the smaller cylinder section 220 and be compressed therein. Thus a reciprocatory air compressor is provided which will maintain a continual pressure on the oil in the accumulator RO. The oil pumping portion and the air compressing portion of the pump AO are both driven by the same eccentric from a single drive shaft, which materially simplifies the structure, renders it more compact and reduces the fluctuations in driving torque.

*Assembled Unit*

As shown in FIGURE 13, the apparatus constitutes a self-contained automatic unit for powering and controlling the driven parts on a machine. The power side of each piston motor, of which exemplary representations are indicated at the upper and lower portions of the left-hand half of FIGURE 13, is connected by means of a liquid column 26 with a pulsator section which includes a cylinder 14 having a piston 16 reciprocable in response to the cam follower 18 riding on the surface of a rotary cam 12. The rotary cams 12 are turned by a central shaft 10 for each program transmitter component HC. Several of these units HC—each containing from a few to a dozen or more cam pulsator sections—may be operated simultaneously by means of the gear box drive adapter GD which turns all of the cam shafts 10 in unison and which also serves as a spacer section upon which the units HC may be supported. A single, two-speed transmission ST may be provided to give two-speed motion to the several cam shafts 10, if desired.

Oil leaked from a liquid column 26 is returned on every cycle by the replenishing portion 24 of the balancing valve 20 connected to the low pressure reservoir 27 incorporated in each unit HC. A sight gage 250 (FIGURE 5) on the side of the low pressure reservoir 27 indicates when the level of the hydraulic fluid therein gets too low. By means of a valve 252 associated with each low pressure reservoir 27 and connected with the oil in the accumulator RO by means of suitable piping 254, the required level of the hydraulic fluid may be maintained. A suitable filter or strainer 256 may be interposed in the line 254 between the accumulator RO and the first of the valves 252 associated with the reservoirs 27.

To maintain the required low, super-atmospheric pressure on the oil in the reservoirs 27, air under pressure is introduced to the upper portion of the reservoirs 27 through a conduit 258 which connects with the air under high pressure in the upper portion of the accumulator RO. In the line 258 adjacent the accumulator RO is a pressure relief valve 260 for maintaining only the desired pressure level on the return oil in the accumulator. An air pressure regulator or reducer 262 is interposed in the line 258 between the reservoir RO and the reservoirs 27 to substantially reduce the amount of pressure which is admitted to the upper half of the reservoirs 27. On either side of the regulator 262, a pressure gage may be provided a afford a quick visual check upon pressure conditions: the first gage 264 registers the pressure upon the oil in the high pressure "return oil" accumulator, and the second gage 266 indicates the pressure on the oil in the low pressure reservoirs 27.

Air is continually compressed into the upper portion of the high pressure accumulator RO (subject to the control of valve 260) by the compressor portion of the pump AO, and oil is continually pumped through the filling valve FV in the cover for the cavity RO and back to the atmospheric reservoir 146 by the pump portion of the pump AO; when the level of the oil in the high pressure accumulator RO falls too low, as indicated by the sight gage 172, the level may be reinstated by actuation of the hand plunger 162 on the filling valve FV. Both reservoirs 146 and RO are compactly and protectively housed in the base assembly BA, as is the prime mover 132 for powering the input shaft 62 of the two speed transmission ST, which also powers the pump AO.

Applied to a piece of complex machinery, the mechanico-hydraulic drive unit of this invention powers and controls the moving parts with extreme precision and speed. The unit itself, positioned handily below or adjacent the actual machinery, may act in effect as a bed for the machine. It cooperatively groups all the essential drive components in a compact structure with every advantage of component interchangeability which accompanies standardized elements. With protective housings particularly designed to suit the drive unit of this invention to a large variety of applications on a random assortment of machines, the unit—in part or in its entirety—may be incorporated in completely new machines or may be used to modify existing machinery. Combined with any machine following programmed cycles, the drive unit functions with a minimum of physical interference with the moving parts in the working areas of the machine.

For instance, a rotary indexing table may be positioned for intermittent angular movement out of the way of the drive unit upon the support T, with a plurality of work stations including work performing or assembly tooling peripherally positioned therearound. Mechanism actuated by hydraulic motors for indexing the table to convey workpieces seriatim from station to station entails no more than suitable piping 26 interconnecting the hydraulic motors and respective pulsator sections of the drive unit's transmitters. Similarly, the movable parts associated with the various work stations may be interconnected with the drive unit only by flexible conduits.

Such simplicity of design renders the parts of both the machine and the drive unit readily accessible for maintenance and repairs, which are infrequently required because of the paucity of moving mechanical parts in the drive unit, and the protective nature of the housings for the various components of the unit.

While the above described embodiment constitutes a preferred mode of carrying out this invention, many other forms might be adopted within the scope of the actual invention, which is variously claimed as:

1. A mechanico-hydraulic power and control unit for an automatic machine comprising a central base section and a laterally projecting base extension, a central spacer section extending upwardly from the central section, a gear box in the spacer section having a plurality of drive shafts extending generally horizontally and radially at a level above the base extension, gearing connecting the shafts for synchronous rotation, one of the shafts extending in the same direction as the base extension, a transmission connected to drive said one shaft and mounted above the base extension, a prime mover connected to drive the transmission, and a plurality of pulse program transmitters connected to a plurality of said drive shafts and each comprising a plurality of rotary cams and a corresponding plurality of hydraulic pulse transmitters driven by the cams.

2. In a mechanico-hydraulic drive unit for an automatic machine: a central base section; a base assembly projecting laterally from the central section; a spacer section projecting upwardly from the central section; a gear box associated with the spacer section including a plurality of drive shafts extending radially and generally horizontally; a transmission mounted above the base assembly; gearing in the gear box interconnecting the transmission and each of the drive shafts; a plurality of rotary cam actuated pulse program transmitting units, one mounted adjacent the transmission above the base assembly, the others mounted on the spacer section; means connecting each of the other units with a gear box drive shaft; means connecting the one unit with the transmission; a high-pressure fluid reservoir in the base assembly; first liquid columns connected between one end of shiftable piston type fluid motors and the high-pressure reservoir; second liquid columns connected between the other end of the fluid motors and the transmitting units; and a prime mover mounted in the base assembly for powering the transmission whereby all of the transmitting units are driven in unison.

3. In a mechanico-hydraulic drive unit for an automatic machine: a central base section; a base assembly projecting laterally from the central section; a spacer section projecting upwardly from the central section; a gear box associated with the spacer section including a plurality of drive shafts extending radially and generally horizontally; a transmission mounted above the base assembly; gearing in the gear box interconnecting the transmission and each of the drive shafts; a plurality of rotary cam actuated pulse program transmitting units, one mounted adjacent the transmission above the base assembly, the others mounted on the spacer section; means connecting each of the other units with a gear box drive shaft; means connecting the one unit with the transmission; and a prime mover mounted in the base assembly for powering the transmission whereby all of the transmitting units are driven in unison.

4. In a mechanico-hydraulic drive unit for an automatic machine: a central base section; a base assembly projecting laterally from the central section; a spacer section projecting upwardly from the central section; a gear box associated with the spacer section; a transmission mounted above the base assembly; a plurality of rotary cam actuated pulse program transmitting units supported on the spacer section; gearing interconnecting the transmission and the transmitting units; and a prime mover in the base assembly for powering the transmission whereby all of the transmitting units are driven in unison.

5. In a power and control unit for an automatic machine: a rotary cam actuated pulse program transmitting unit; a two-speed transmission for driving the unit; a base assembly supporting the transmission and the unit; the base assembly housing an atmospheric fluid reservoir, a high-pressure fluid reservoir, and a prime mover; means interconnecting the prime mover and the transmission for powering the transmission; means driven by the transmission for transferring fluid from the atmospheric reservoir to the high-pressure reservoir; a first liquid column connected between one end of a shiftable piston type fluid motor and the high-pressure reservoir; and a second liquid column connected between the other end of the fluid motor and the transmitting unit.

6. A mechanico-hydraulic motivator for an automatic machine comprising a base section adapted to support shiftable machine elements, a base assembly projecting laterally from the base section, the base assembly including a prime mover and a source of pressurized fluid, a transmission unit supported above the base assembly and including an input shaft and a generally horizontal output shaft, a transmitting unit including a cam case, a generally horizontal camshaft journalled in the cam case, and a plurality of liquid column motion transfer devices for actuating machine elements connected to be controlled in both directions and powered in one direction by the camshaft, means connected to drive the camshaft from the output shaft and means connected to drive the input shaft from the prime mover, and means connecting the source of pressurized fluid with the motion transfer devices to power them in the other direction.

7. A mechanico-hydraulic motivator for an automatic machine comprising a transmitting unit including a cam case, a camshaft journalled in the cam case, and a plurality of liquid column motion transfer devices connected to be controlled in both directions and powered in one direction by the camshaft, a transmission unit including an input shaft and an output shaft, means connected to drive the camshaft from the output shaft, a base assembly including a prime mover and a source of pressurized fluid, means connected to drive the input shaft from the prime mover, means connecting the source of pressurized fluid with the motion transfer devices to power them in the other direction, and means powered by the prime mover for maintaining a predetermined pressure on the source of fluid in the base assembly.

8. A mechanico-hydraulic motivator for an automatic machine comprising a transmitting unit including a rotary camshaft and a plurality of liquid column motion transfer devices connected to be controlled in both directions and powered in one direction by the camshaft, a base assembly supporting the transmitting unit and including a prime mover and a source of pressurized fluid, means connected to drive the camshaft from the prime mover, means powered by the prime mover for maintaining a predetermined pressure on the source of fluid in the base assembly, and means connecting the source of pressurized fluid with the motion transfer devices to power them in the other direction.

9. A mechanico-hydraulic motivator for an automatic machine comprising a transmitting unit including a rotary camshaft and a plurality of liquid column motion transfer devices connected to be controlled in both directions and powered in one direction by the cam shaft, a base assembly including a casing forming three compartments, one serving as a reservoir for fluid under atmospheric pressure, the second serving as an accumulator for fluid under super-atmospheric pressure, and the third housing a prime mover, means connected to drive the camshaft from the prime mover, means powered by the prime mover for maintaining the super-atmospheric pressure on the fluid in the accumulator compartment, means for transferring fluid from the reservoir compartment to the accumulator compartment, and means connecting the accumulator compartment with the motion transfer devices to power them in the other direction.

10. A mechanico-hydraulic motivator for an automatic machine comprising a transmitting unit including a power driven rotary camshaft and a plurality of liquid column motion transfer devices connected to be controlled in both directions and powered in one direction by the camshaft, a base assembly including a casing forming at least two compartments, one serving as a reservoir for fluid under atmospheric pressure and the second serving as an accumulator for fluid under super-atmospheric pressure, means including an intermittently operable arrangement for transferring fluid from the reservoir compartment to the accumulator compartment, means including a compressor and a pressure regulator for maintaining the super-atmospheric pressure on the fluid in the accumulator compartment, and means connecting the accumulator compartment with the motion transfer devices to power them in the other direction.

References Cited in the file of this patent

UNITED STATES PATENTS

| | | |
|---|---|---|
| 1,384,283 | Vincent | July 12, 1921 |
| 1,696,253 | Pinckney | Dec. 25, 1928 |
| 1,719,502 | Dienner | July 2, 1929 |
| 1,756,971 | Brown | May 6, 1930 |
| 2,362,586 | Ruth | Nov. 14, 1944 |
| 2,423,701 | Hardy | July 8, 1947 |
| 2,435,053 | Piccardo et al. | Jan. 27, 1948 |
| 2,702,008 | Stockard | Feb. 15, 1955 |
| 2,755,686 | Bade | July 4, 1956 |
| 2,923,131 | Furman et al. | Feb. 2, 1960 |
| 2,924,944 | Matlachowsky | Feb. 16, 1960 |

FOREIGN PATENTS

| | | |
|---|---|---|
| 473,229 | Great Britain | Oct. 8, 1937 |
| 581,686 | Great Britain | Oct. 22, 1946 |